United States Patent [19]
Sato

[11] Patent Number: 4,510,563
[45] Date of Patent: Apr. 9, 1985

[54] SWITCHING POWER SUPPLY

[75] Inventor: Takehisa Sato, Ora, Japan

[73] Assignees: Sanyo Electric Co. Ltd., Moriguchi; Tokyo Sanyo Electric Co., Ltd., Oizumimachi, both of Japan

[21] Appl. No.: 560,196

[22] Filed: Dec. 9, 1983

[30] Foreign Application Priority Data

Feb. 25, 1983 [JP] Japan .................................. 58-31436
Mar. 2, 1983 [JP] Japan .................................. 58-35132

[51] Int. Cl.³ .......................................... H02M 3/335
[52] U.S. Cl. ...................................... 363/20; 323/289
[58] Field of Search ...................................... 363/8-21, 363/56; 323/289; 307/300

[56] References Cited

U.S. PATENT DOCUMENTS

| 4,220,987 | 9/1980 | Rao et al. | 323/289 X |
| 4,312,029 | 1/1982 | Zellmer | 323/289 X |
| 4,322,785 | 3/1982 | Walker | 363/21 |
| 4,352,054 | 9/1982 | Grünsch et al. | 323/289 X |
| 4,420,804 | 12/1983 | Nishino | 363/21 |

Primary Examiner—Peter S. Wong
Attorney, Agent, or Firm—Berman, Aisenberg & Platt

[57] ABSTRACT

An off-line switching regulated power supply employing a switching transistor, wherein the base drive system is improved to supply a reverse base current, remaining an interval after the termination of a forward base current, thereby the influence of the storage time of the switching transistor is removed and various drawbacks including the problem due to the incompatible characteristics of a breakdown voltage and switching speed, the problem due to delay in turning-off and the problem of overheating, are removed, resultantly enabling to provide a switching power supply which is allowed to employ a higher switching frequency.

7 Claims, 15 Drawing Figures

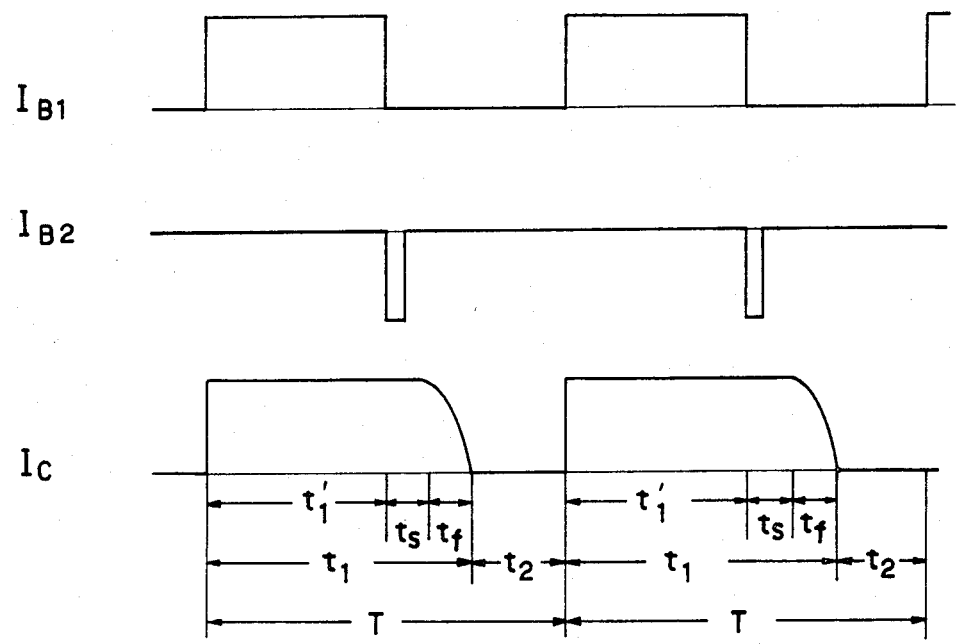
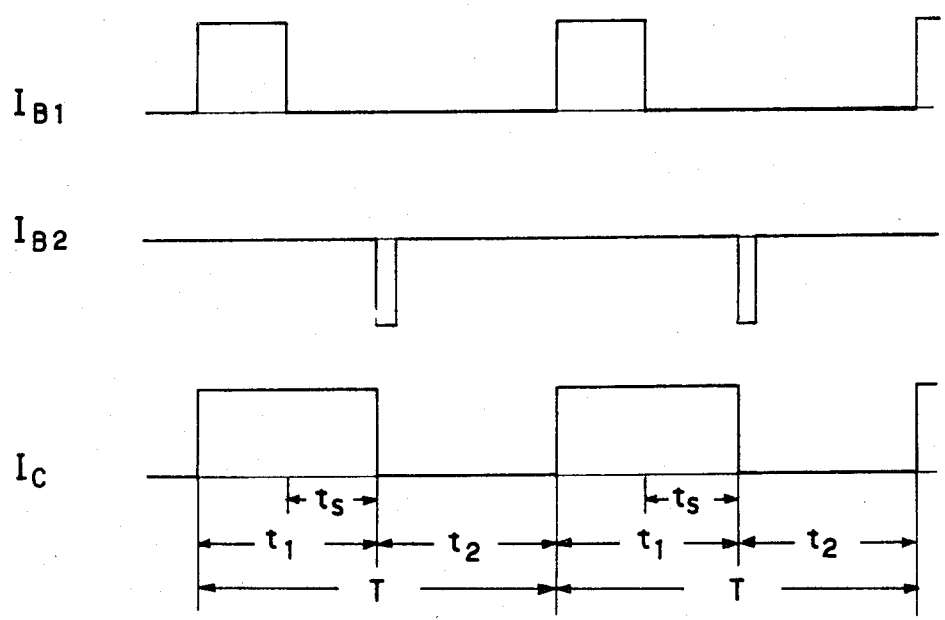

SWITCHING POWER SUPPLY

FIELD OF THE INVENTION

This invention relates to an off-line switching regulated power supply (hereinafter referred to as a switching power supply), and more particularly to an improvement applicable to a switching power supply for allowing employment of a higher switching frequency, resultantly permitting a smaller volume and a lighter weight thereof. Further specifically, this invention relates to an improvement applicable to the base drive system applicable to a switching power transistor employed in a switching power supply, resultantly allowing employment of a transistor having large amounts of breakdown voltage and storage time and a slow switching speed, despite a higher switching frequency is employed for a switching power supply to realize the aforementioned ultimate purposes.

BACKGROUND OF THE INVENTION

A switching power supply is defined as a means for transforming a DC voltage, which comprises an AC transformer of which the primary winding is supplied with a DC input voltage, a switching means which periodically interrupts the primary current of the transformer, a regulation means which regulates the switching means to allow the aforementioned function, a rectifier which is connected to the secondary winding of the transformer, and a smoothing circuit which smoothes the DC output voltage of the rectifier.

Advantages inherent to a switching power supply are:

(a) A relatively large DC voltage transformation ratio is allowed, and (b) The DC output voltage is readily regulated by regulating the duty ratio (the ratio of the conductive period vs. the switching period) of the primary current of a transformer, thereby allowing a switching power supply to produce a stable DC output voltage, regardless of variation in the input voltage and/or the load, provided a sensor for monitoring the DC output voltage is arranged and a switching means is regulated in response to this detected DC output voltage.

The simplest and most effective circuit for a switching power supply having the output capacity range of 10 through 300 W can be designed with a single transistor flyback system or a single transistor forward converter system. A schematic connection diagram of each such system is shown respectively in FIG. 1 and FIG. 2.

Referring to FIGS. 1 and 2, a switching power supply comprises a rectifier 1, which converts an AC input to a DC output, a transformer 4, which has a ferrite core, a rectifier 5, a smoothing circuit 6, and a switching means 3 which is illustrated as a switching power transistor which periodically interrupts the primary current of the transformer 4, and a regulation means 2 which further comprises a pulse oscillator, a pulse width modulation circuit and a drive circuit.

In the prior art, 20 through 30 KHz is employed as the switching frequency for switching power supplies. On the other hand, it is well-known that a higher switching frequency readily causes a smaller volume and a lighter weight for transformers and/or inductors, if any, resultantly causing a smaller volume and a lighter weight for a switching power supply. This is the reason why various efforts are being used for development of a switching power supply which allows employment of a higher switching frequency.

However, it is not easy to manufacture a switching power supply which allows employment of a high switching frequency which is in excess of 50 KHz due to various parameters.

The first parameter which disturbs increase of switching frequency of a switching power supply is the nature which is inherent to a semiconductor device more specifically to a transistor. In other words, a transistor having a higher switching speed is inevitably accompanied by a lower breakdown voltage. Namely, a switching transistor having a higher switching speed is required to have (a) a smaller relative resistance in the base region and (b) less width for the base, despite the fact that these requirements evidently result in a smaller breakdown voltage. Incidentally, a higher switching frequency employed for a switching power supply is accompained by a higher inpulse voltage, requiring a higher breakdown voltage for a switching transistor employed for a switching power supply. Thus, it is difficult to increase switching frequency of a switching power supply, unless some other means is employed to decrease the impulse voltage which may occur in the transistor circuit or the breakdown voltage required for a transistor employed in a switching power supply.

The second parameter which inhibits increase of switching frequency of a switching power supply is a limitation imposed by the switching speed of a switching power transistor employed in a switching power supply. Namely, it is the delay in turning-off a switching transistor due to the influence of storage time. In other words, a collector current continues flowing for a period which is the sum of storage time and fall time, even after a forward base current is discontinued. This means the switching speed of a transistor is limited by the length of storage time and fall time, resultantly meaning that a switching power supply requires a switching frequency which is slow enough in comparison with the sum of storage time and fall time of a transistor employed in the switching power supply, because no switching function can be expected for an excess switching frequency.

Due to these two parameters, it is not easy to manufacture a switching power supply which employs a higher switching frequency.

One example of the time chart of a base drive system generally employed for a switching power supply available in the prior art is shown in FIG. 3. Referring to the Figure, a forward base current $I_{B1}$ is applied continuously during the forward half $t_1'$ of the switching period T, and reverse base current $I_{B2}$ is applied at the beginning of the reverse half of the switching period T to turn off the collector current $I_C$. However, even after the reverse base current $I_{B2}$ has been applied, the collector current $I_C$ continues flowing during the storage time $t_s$ and fall time $t_f$. As a result, the conductive period $t_1$ is longer than the period in which the forward base current $I_{B1}$ flows, by the sum of the storage time $t_s$ and the fall time $t_f$.

Since the flow of the collector current $I_c$ of a transistor is limited to the period in which a current is maintained in the forward direction between a base and an emitter, the continuous supply of forward base current $I_{B1}$ is essential, provided the sum of storage time $t_s$ and fall time $t_f$ is marginal in comparison with the switching period T.

However, this base drive system is involved with the following drawbacks, in the cases where the switching frequency is high in comparison with the sum of storage time $t_s$ and fall time $t_f$ of a switching power transistor employed in a switching power supply.

Firstly, since the collector current $I_c$ is not discontinued until the sum of storage time $t_s$ and fall time $t_f$ expires, this delay in turning-off of a switching power transistor becomes a parameter which disturbs an accurate maintenance of duty ratio ($t_1/T$) of a switching power supply. It is clear that an entirely no switching function is allowed in the extreme cases.

Secondly, a higher switching frequency increases the ratio ($t_s+t_f/T$) of the period ($t_s+t_f$) in which a switching loss (a loss generated in a transistor due to its resistance, which is gradually increased following the progress of turning-off) is generated and the entire switching period (T), resultantly causing a possibility of overheating a switching power transistor employed in a switching power supply.

OBJECTS AND SUMMARY OF THE INVENTION

A first object of this invention is to provide a switching power supply of which the switching frequency is higher.

A second object of this invention is to provide a switching power supply of which the switching frequency is higher and the input is supplied with an AC voltage.

A third object of this invention is to provide a switching power supply of which the switching frequency is higher and of which the turning-off time is short, irrespective of the amount of the collecter current of a transistor employed in the switching power supply.

A fourth object of this invention is to provide a switching power supply of which the switching frequency is higher and of which the DC output voltage can be automatically regulated.

To achieve the foregoing first object of this invention, a switching power supply in accordance with the first embodiment of this invention is provided (a) a transformer of which the primary winding is applied a DC input voltage, (b) a switching means comprising a switching transistor which periodically interrupts the primary current of the transformer, (c) a regulation means for regulating the switching means and which applies to the switching transistor a forward base current and a reverse base current which is applied after a specific period after termination of the forward base current, (d) a rectifier which is connected to the secondary winding of the transformer, and (e) a smoothing circuit which smoothes the DC output voltage from the rectifier.

This invention is based on the following concept, which will be described, referring to a time chart shown in FIG. 4:

(1) The forward base current $I_{B1}$ is not necessarily required to continue during the entire conductive period $t_1$, because the collector current $I_c$ does not terminate until the sum of storage time $t_s$ and fall time $t_f$ expires, even after the forward base current $I_{B1}$ has terminated.

(2) The intensity and the duration of the forward base current $I_{B1}$ can be selected to be necessary and sufficient to allow the corresponding storage time $t_s$ to expire at a time at which the reverse base current $I_{B2}$ is scheduled to begin flowing.

(3) Therefore, provided a base drive system allows the storage time $t_s$ to terminate at or slightly later than the time at which a reverse base current $I_{B2}$ begins to flow, the collector current $I_c$ can be turned off without delay in response to the commencement of the reverse base current $I_{B2}$, entirely irrespective of the influence of the storage time $t_s$.

(4) This base drive system is realized by discontinuation of a forward base current $I_{B1}$ at a time which is in advance of the commencement of the following reverse base current $I_{B2}$ by a period identical to or slightly shorter than the corresponding storage time $t_s$, thereby (a) the collector current $I_c$ is allowed to continue flowing until the commencement of the following reverse base current $I_{B2}$ due to the influence of the storage time, (b) the carriers which were stored in a base are allowed to flow out of the base before the following reverse base current begins to flow, and (c) the collector current $I_c$ is allowed to turn off without delay, resultantly realizing a higher switching speed and considerably decreasing the switching loss.

(5) This base drive system is allowed to overcome the aforementioned drawbacks, including (a) the problem regarding the breakdown voltage of a switching power transistor which is decreased by increase of switching speed (increase in the relative resistance in the base region and decrease in the base width), (b) the problem regarding inferior switching function due to a slower switching speed of a switching power transistor, and (c) the problem of overheating a switching transistor due to a prolonged turning-off, resultantly enabling a switching power supply of which the switching frequency is higher, to be provided.

We have named this base drive system a "Tri-State Drive System", as compared to the conventional base drive system, because this base drive system involves three states: a state where a forward current $I_{B1}$ flows; a high impedance state; and a reverse current $I_{B2}$ state.

To achieve the foregoing second object of this invention, a switching power supply in accordance with the second embodiment of this invention is provided, in addition to the aforementioned units, a second rectifier which is inputted an AC input and outputs a DC input voltage to the aforementioned transformer.

To achieve the foregoing third object of this invention, a switching power supply in accordance with the third embodiment of this invention is provided, in addition to the units provided for the first embodiment, a sensor for monitoring the collector current $I_c$, and a means for calcutating, in response to the collector current $I_C$, the corresponding storage time $t_s$ and the optimum duration time of the forward base current $I_{B2}$.

To achieve the foregoing fourth object of this invention, a switching power supply in accordance with the foruth embodiment of this invention, a switching power supply in accordance with the fourth embodiment of this invention is provided, in addition to the units provided for the first embodiment, a sensor for monitoring the output voltage of the switching power supply, a reference voltage, and a means for calculating, in response to the output voltage of the switching power supply and the reference voltage, the optimum duty ratio of the switching means. A variaty is allowed for the location at which the output voltage is monitored. Namely, included are DC output terminal, the primary or secondary winding of the transformer and the AC input terminal, if any.

BRIEF DESCRIPTION OF THE DRAWINGS

This invention, together with its various features and advantages, can be readily understood from the following more detailed description presented in conjunction with the following drawings, in which:

FIG. 3 is a time chart of a base drive system for a switching power supply in the prior art, FIG. 4 is a time chart of a base drive system for a switching power supply in accordance with this invention.

DETAILED DESCRIPTION

Described below will be one each of the aforementioned embodiments and modifications of this invention.

EMBODIMENT 1

Figure 1:
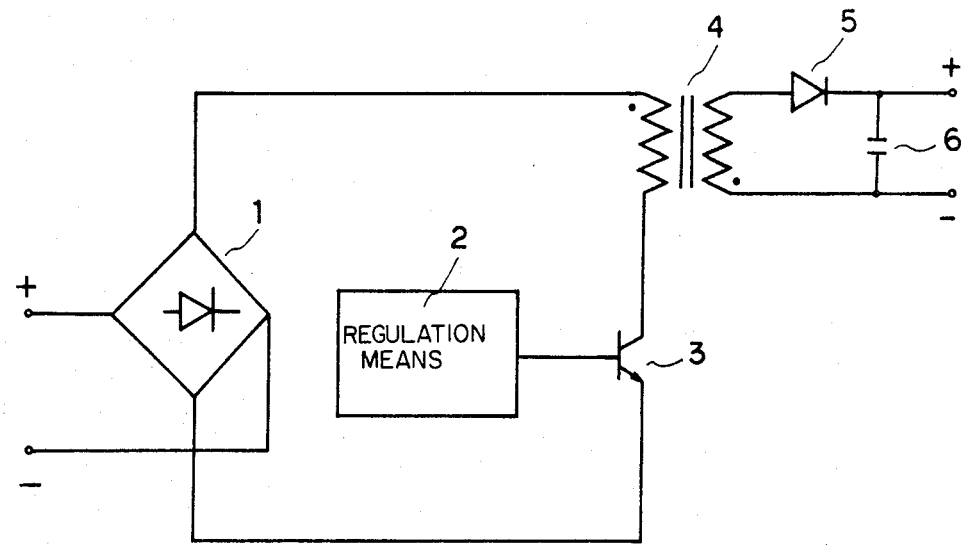
FIG. 1 is a schematic circuit diagram of a single transistor flyback type switching power supply in the prior art.
Figure 2:
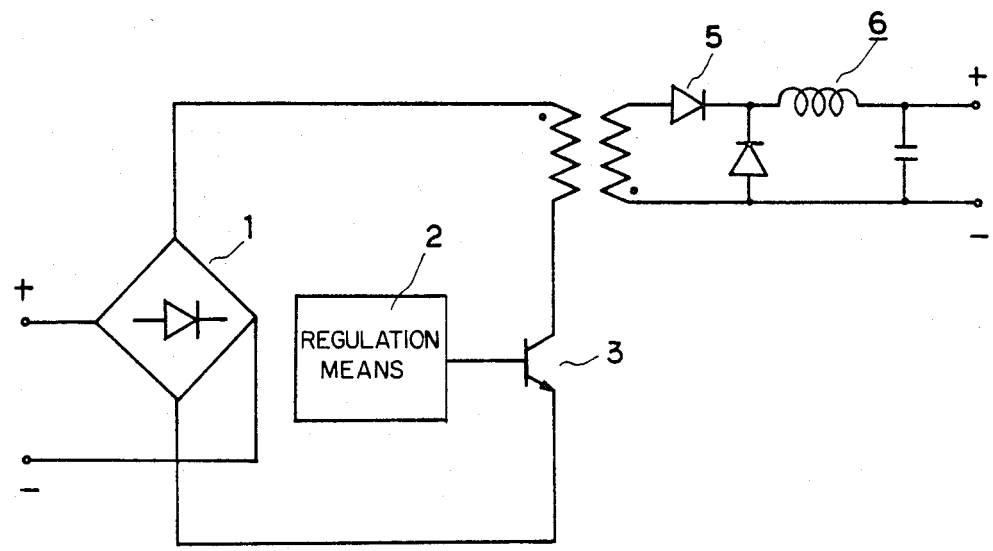
FIG. 2 is a schematic circuit diagram of a single transistor forward converter type switching power supply in the prior art.
Figure 5:
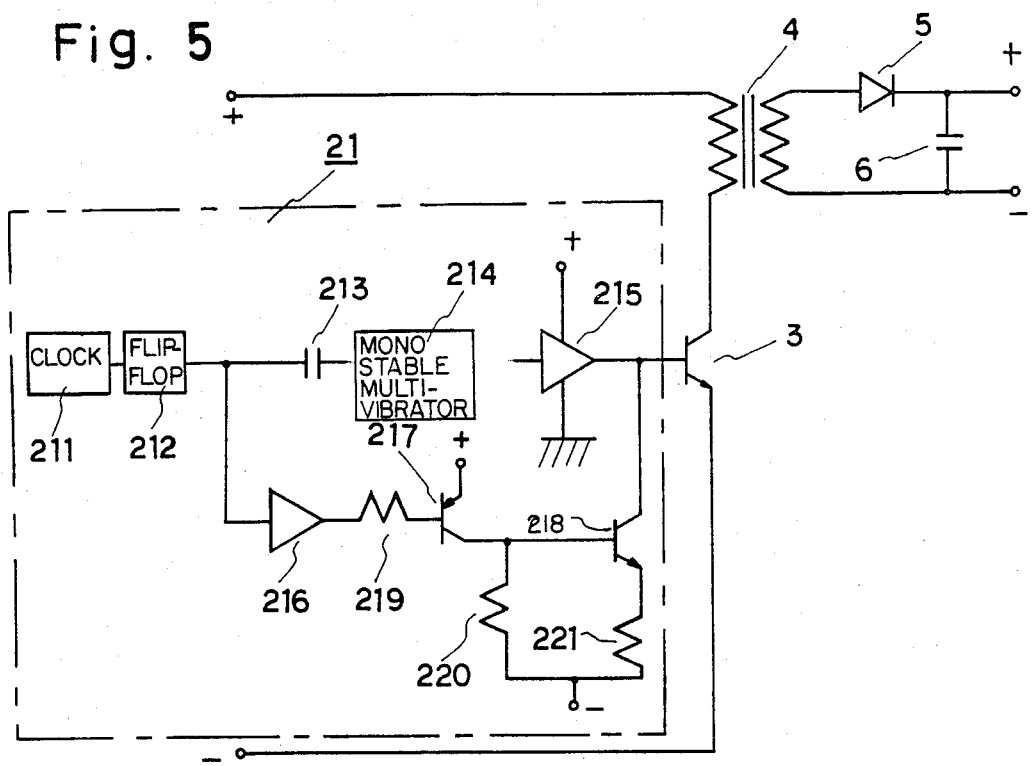
FIG. 5 is a schematic circuit diagram of a switching power supply in accordance with the first embodiment of this invention.

Referring to FIG. 5, a ferrite core transformer 4 receives a DC input voltage at its primary winding which is connected to a switching power transistor 3 which is regulated by a regulation circuit 21 (represented by an area enclosed by a chain line) which consists of a clock 211, a flip-flop 212, a capacitor (a differential circuit) 213, a monostable multivibrator 214, buffer amplifiers 215 and 216, resistors 219, 220, 221, a PNP transistor 217 and an NPN transistor 218. A rectifier 5 is connected to the secondary winding of the transformer 4. A smoothing capacitor 6 is arranged to the output terminals of the rectifier 5.

Figure 6:
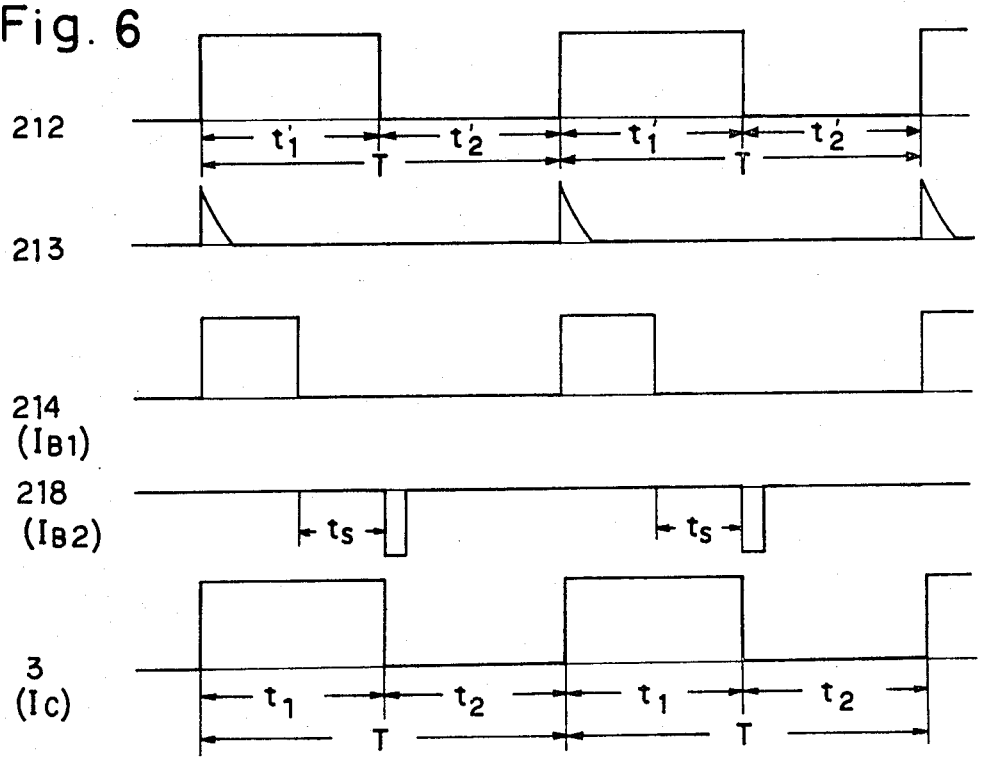
FIG. 6 is a time chart of the base drive system for a switching power supply in accordance with the first embodiment of this invention.

Referring to FIG. 6, one cycle of the flip-flop 212 determines on switching period T of the switching power transistor 3. The switching period T consists of the forward half $t_1'$ and the reverse half $t_2'$. The front edge of the output from the flip-flop 212 is detected by the capacitor 213. In response to this detection, the monostable multivibrator 214 shifts to a high level and stays at the level for a predetermined period which can be adjusted to be 20 through 50% of the forward half $t_1'$ or the conductive period $t_1$, and a forward base current $I_{B1}$ is applied to the switching power transistor 3 only during this shorter period in which the monostable multivibrator 214 stays in a high level. The switching power transistor 3 is turned on by this forward base current $I_{B1}$, but it is not turned off by the termination of the forward base current $I_{B1}$ until another transistor 218 outputs a reverse base current $I_{B2}$, in response to the signal applied by a transistor 217 which is turned on in response to the rear edge of the signal from the flip-flop 212. This is because the storage time $t_s$ sustains the collector current $I_c$ even after the forward base current $I_{B1}$ has terminated.

Since the duration time of the monostable multivibrator 214 is selected to be the difference between the conductive period $t_1$ and the storage time $t_s$, most of the carriers which were stored in the base have flowed out of the base by the beginning of the non-conductive period $t_2$. As a result, the collector current $I_c$ begins to flow immediately in response to the front edge of the reverse base current $I_{B2}$ which flows in response to the rear edge of the signal from the flip-flop 212, resultantly removing the influence caused by the storage time. Incidentally, the fall time is reduced to a quater of the corresponding amount in the prior art, because the influence of over-drive which is necessary in the prior art is removed in this invention.

Incidentally, since the length of turning-off period in which the resistance between a collector and an emitter is increased is extremely short, the switching loss is decreased to a marginal level.

Accordingly, the aforementioned drawbacks, inevitable in the prior art, including the problem caused by the incompatible characteristics of breakdown voltage and switching speed in a switching transistor, the influence of the delay in turning-off, and the problem of overheating of a switching transistor due to a long turning-off period, are successfully removed by this invention.

Figure 7:
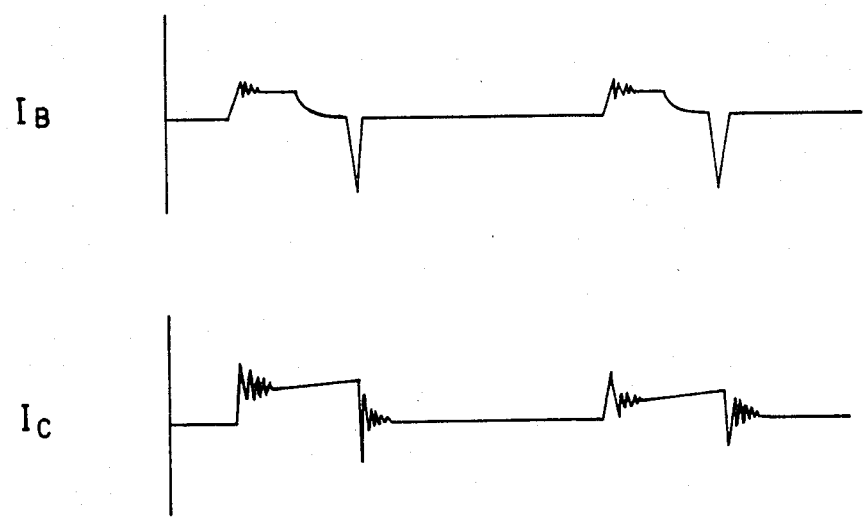
FIG. 7 is a reproduction of an oscillogram showing the base current and the collector current of a switching power supply in accordance with the first embodiment of this invention.

FIG. 7 shows the relations between time and the base current and the collector current of the aforementioned switching power supply in accordance with the first embodiment of this invention. Referring to the Figure, the fall time $t_f$ was decreased to 80 ns or a quarter of the corresponding amount in the prior art. Ringing is caused by the inductance component of a circuit. The gradual increase in the collector current $I_c$ can be smoothed by employment of a larger choke coil.

EMBODIMENT 2

Figure 8:
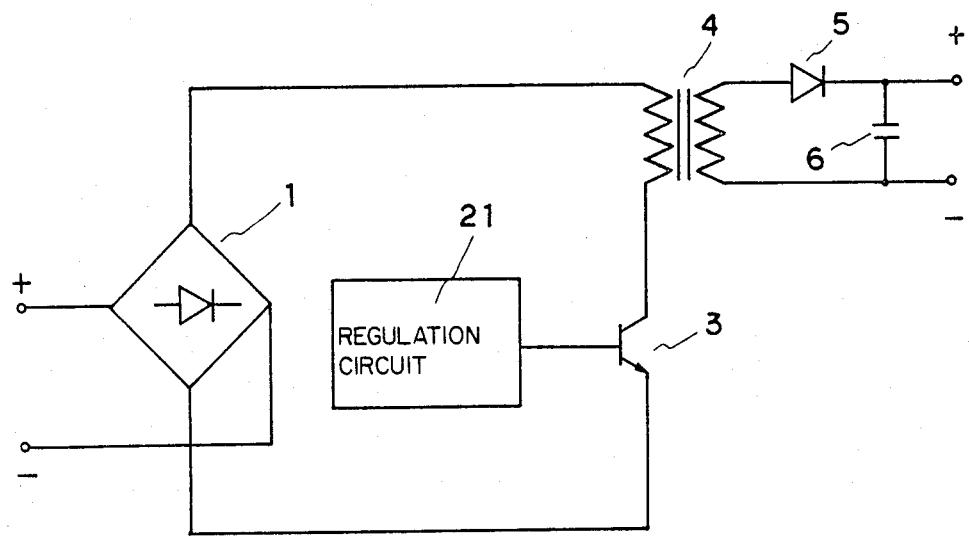
FIG. 8 is a schematic circuit diagram of a switching power supply in accordance with the second embodiment of this invention.

Referring to FIG. 8, a ferrite core transformer 4 receives a DC input voltage at its primary winding through a rectifier 1, thereby this switching power supply accepts an AC input. The other units and/or elements are entirely identical to those of EMBODIMENT 1.

EMBODIMENT 3

This embodiment is based on the following concept:
(1) The storage time $t_s$ is expressed by the following formula:

$$t_s = K l_n \frac{I_{B1} - I_{B2}}{I_C/h_{FE} - I_{B2}}$$

wherein,
  K is a proportion constant,
  $l_n$ is the symbol of natural logarithm,
  $I_{B1}$ is a forward base current,
  $I_{B2}$ is a reverse base current,
  $I_C$ is a collector current,
  $h_{FE}$ is a current gain In other words, the storage time $t_s$ increases following the increase in the forward base current $I_{B1}$ and decreases following the increase in the collector current $I_C$ and in the reverse base current $I_{B2}$. It is longest, when the reverse base current $I_{B2}$ is not applied.

Figure 9:
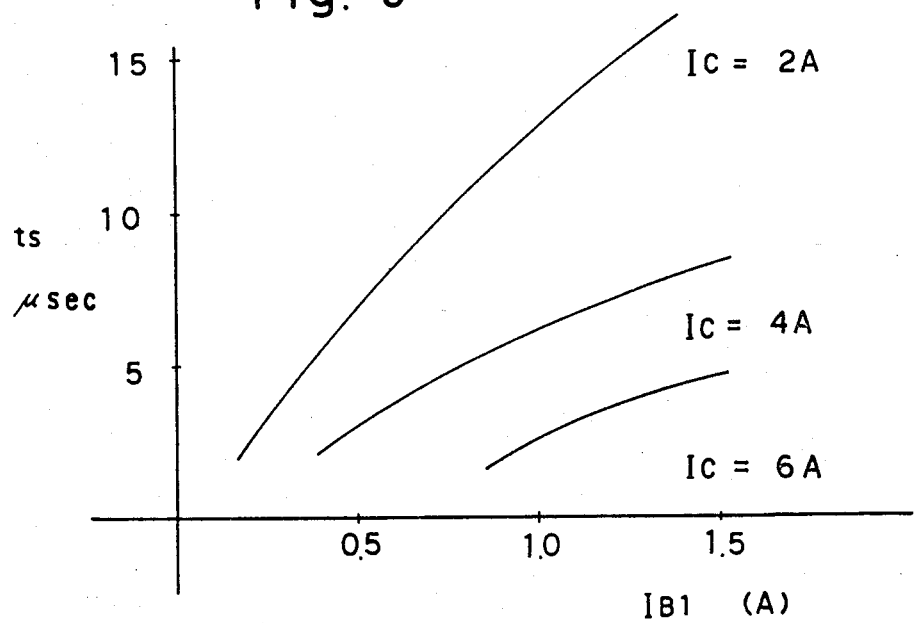
FIG. 9 is a graph showing an example of the storage time $t_s$ vs. forward base current $I_{B1}$ characteristics of the cases where no reverse base current $I_{B2}$ is applied, shown employing the collector current $I_c$ as a parameter.

An example of the storage time $t_s$ vs. forward base current $I_{B1}$ characteristics of the cases where no reverse base current $I_{B2}$ is applied, is shown in FIG. 9 employing the collector current $I_C$ as a parameter.

(2) In order to realize the best results which can be expected in this invention, the duration of the forward base current $I_{B1}$ is required to be identical to the difference between a half of the switching cycle or period T and the storage time $t_s$ which depends on the collector current $I_C$ and the forward base current $I_{B1}$.

(3) A combined means for monitoring the collector current and for calculating the corresponding storage time $t_s$ and the optimum duration of the forward base current $I_{B1}$ is effective to realize the aforementioned best results which can be expected in this invention.

Figure 10:
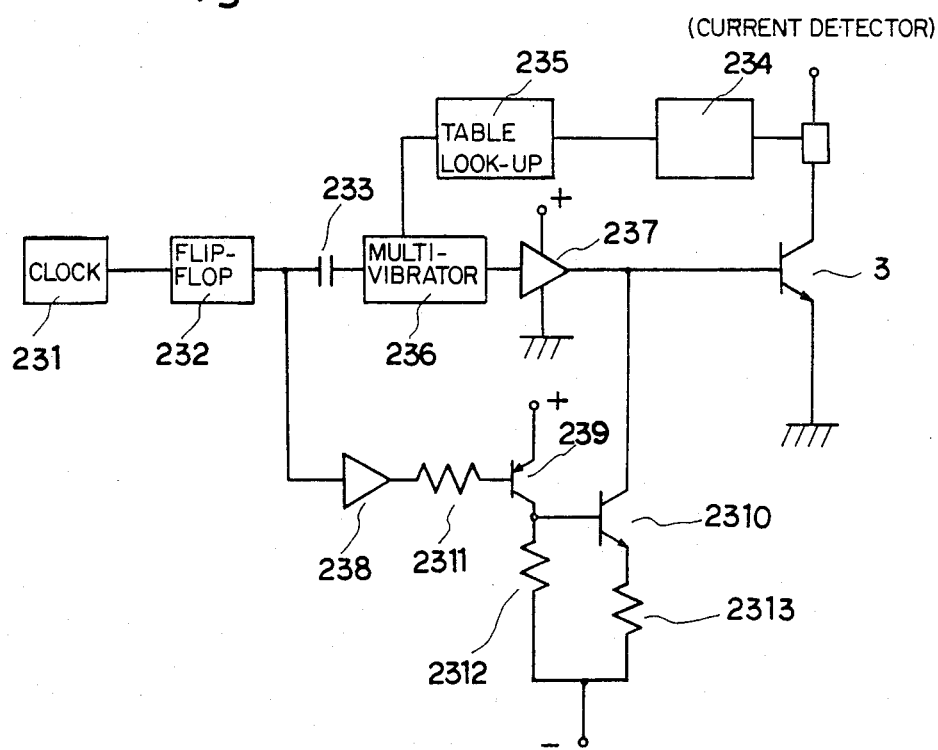
FIG. 10 is a schematic circuit diagram of a base drive system employed in a switching power supply in accordance with the third embodiment of this invention.
Figure 11:
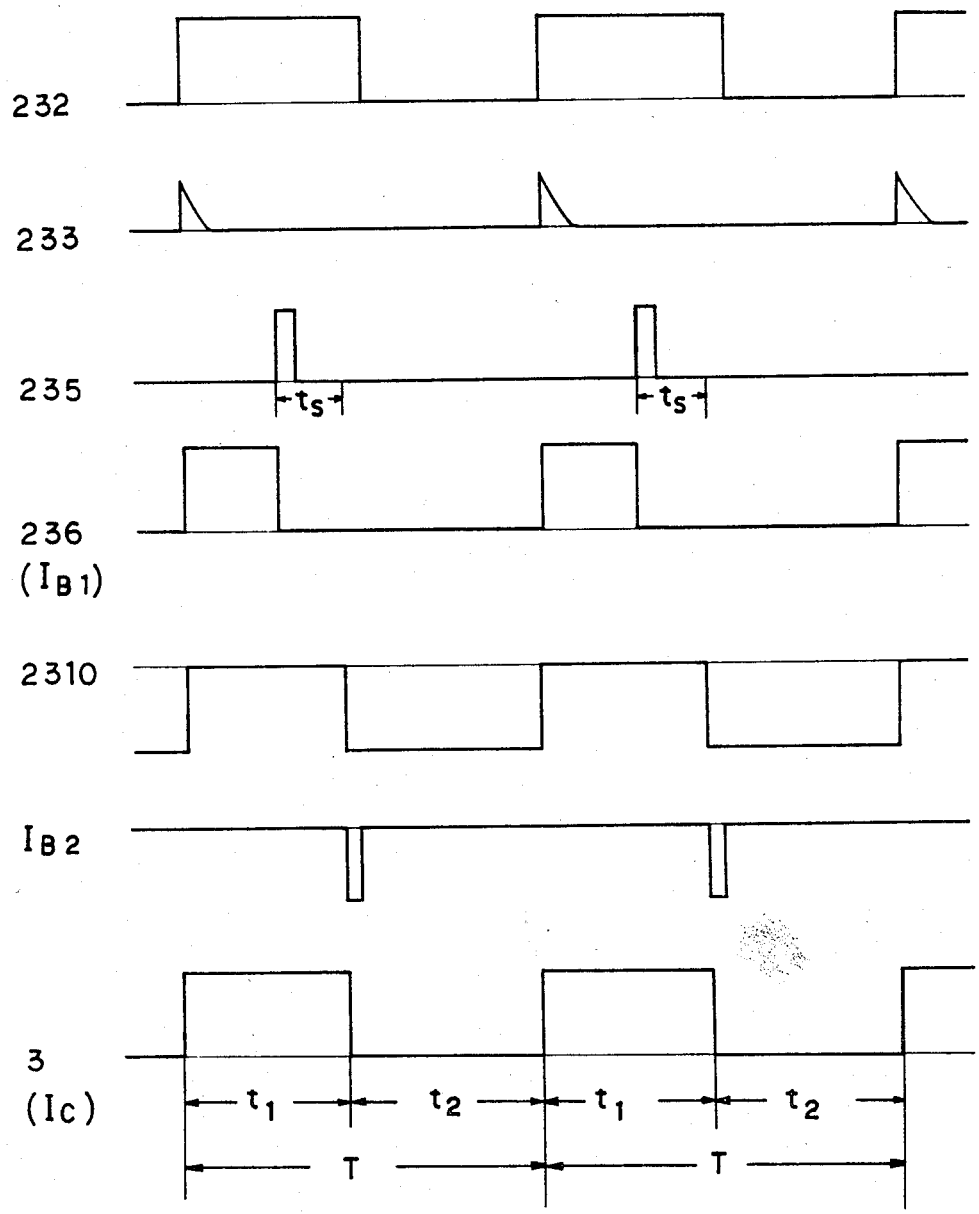
FIG. 11 is a time chart of the base drive system for a switching power supply in accordance with the third embodiment of this invention.

Referring to FIGS. 10 and 11, in response to clock pulses from clock 231, a fliop-flop 232 alternates the signal voltage level every half of one cycle $T_C$ of a switching power transistor 3. A capacitor 233 detects the front edge of the signal from the flip-flop 232 to set a set-reset multivibrator 236. A current detector 234 detects the collector current $I_C$ of the switching power transistor 3. A table looking-up unit 235 determines the optimum duration of the forward base current $I_{B1}$ in response to the detected collector current $I_C$ and a predetermined intensity of the forward base current $I_{B1}$. The set-reset multivibrator 236 is reset at the time when this determined duration expires. As a result, the forward base current $I_{B1}$ is applied to the base of the switching power transistor 3 through a buffer amplifier 237 only during the determined duration period, resultantly enabling the switching power supply to realize the best results expected in this invention.

The reverse base current $I_{B2}$ is supplied to the switching power transistor 3 in a manner similar to that which was described for the first embodiment, referring to FIGS. 5 and 6. Namely, in response to the rear edge of the signal produced by the flip-flop 232, which signal is transmitted through a buffer amplifier 238 and a resistor 2311 to a PNP transistor 239, the PNP transistor 239 turns on to further turn on an NPN transistor 2310 which supplies the reverse base current $I_{B2}$ due to the function of a circuit consisting of the transistors 239 and 2310 and resistors 2312 and 2313 connected as shown in FIG. 10.

EMBODIMENT 4

One of the major advantages inherent to a switching power supply is a possibility in which the DC output voltage is precisely maintained at a predetermined amount, regardless of potential variation in the input voltage and/or in the load.

This embodiment is to realize this advantage within the scope of this invention.

Figure 12:
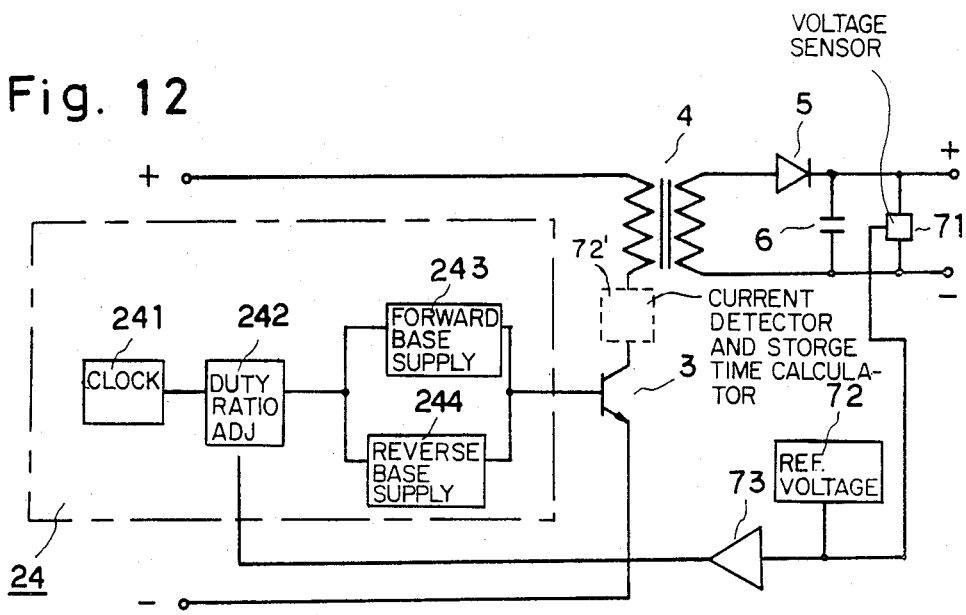
FIG. 12 is a schematic block diagram of a switching power supply in accordance with the fourth embodiment of this invention.

Referring to FIG. 12, a ferrite core transformer 4 receives a DC input voltage at its primary winding which is connected to a switching power transistor 3 which is regulated by a regulation circuit 24 (represented by an area enclosed by a chain line) which consists of a clock 241, a duty ratio adjusting means 242, a forward base current supply means 243 and a reverse base current supply means 244. A rectifier 5 is connected to the secondary winding of the transformer 4. A smoothing capacitor 6 is arranged to the output terminals of the rectifier 5. A voltage sensor 71 detects the output voltage of the switching power supply. The difference between the detected output voltage and a reference voltage 72 is amplified by an amplifier 73, before the voltage deviation is applied to the duty ratio adjusting means 242. In an alternative embodiment, the collector current may be measured and the storage time calculated by element 71' simultaneously with the voltage measurement by sensor 71.

Figure 13:
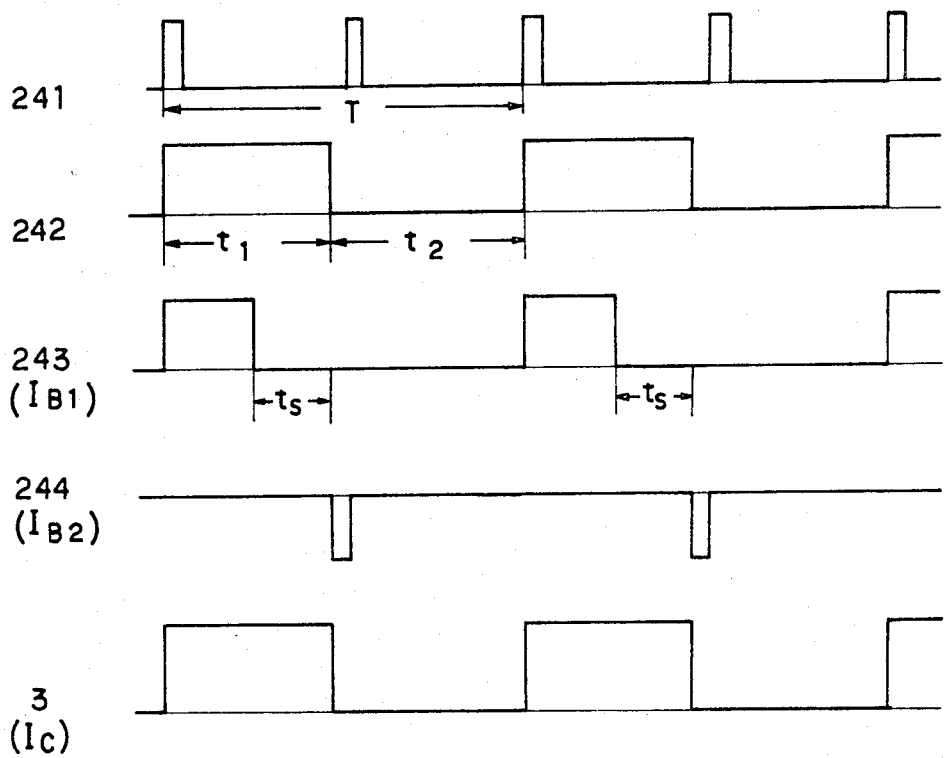
FIG. 13 is a time chart of the base drive system for a switching power supply in accordance with the fourth embodiment of this invention.

Referring to FIG. 13, a clock 241 periodically outputs clock pulses. The duty ratio adjusting means 242 which receives the clock pulses, determines the duration times of the conductive period $t_1$ and the non-conductive period $t_2$, in response to the output of the amplifier 73. The high level of this signal is applied to the forward base current supply means 243 in which the duration time of the forward base current $I_{B1}$ is determined by subtracting a specific length of time from the conductive period $t_1$. Three selections are allowed for this calculation. The first is to determine the duration time of the forward base current $I_{B1}$ by multiplying a fixed number to the duration time of the conductive period $t_1$. The second is to determine the duration time of the forward base current $I_{B1}$ by subtracting a fixed number from the duration time of the conductive period $t_1$. The third is to determine the duration time of the forward base current $I_{B1}$ by subtracting a storage time determined in response to the collector current $I_C$, as is in the case of EMBODIMENT 3, from the duration time of the conductive period $t_1$. The low level of the output signal of the duty ratio adjusting means 242 is applied to the reverse base current supply means 244, and a reverse base current $I_{B2}$ is outputted toward the base of the switching power transistor 3 without delay in response to the rear edge of the pulse outputted by the duty ratio adjusting means 242.

In accordance with this embodiment, a switching power supply having two independent advantages including a higher switching frequency and regulation of DC output voltage, is provided.

A MODIFICATION OF BASE DRIVE SYSTEM APPLICABLE TO EMBODIMENT 4

Figure 14:
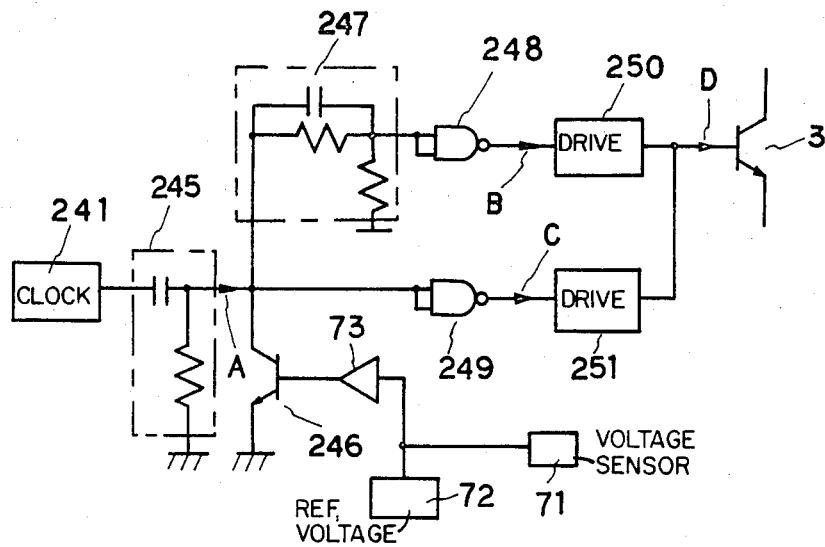
FIG. 14 is a schematic circuit diagram of a modification of the fourth embodiment of this invention.
Figure 15:
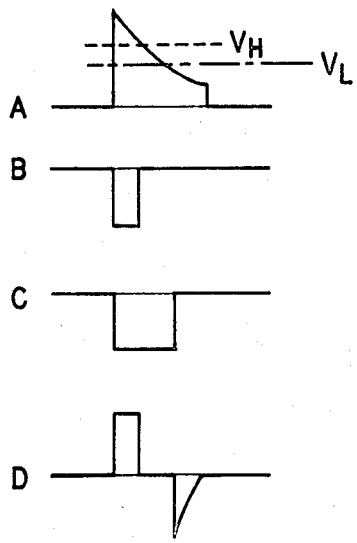
FIG. 15 is a time chart of the base drive system for a switching power supply of a modification of the fourth embodiment of this invention.

Referring to FIGS. 14 and 15, a clock 241 outputs clock pulses, each of which is differentiated by a CR differential circuit 245, of which the time constant is regulated by variation of impedance of a transistor 246 of which the base is applied the output of an amplifier 73 which amplifies the deviation of the DC output voltage of a switching power supply to which this base drive system is applied, from a reference voltage 72. The output signal of the differential circuit 245 which has the wave form represented by A shown in FIG. 15 is separately applied to an inverter 248 having a threshold voltage $V_H$, after passing through a level shift circuit 247 and to an inverter 249 having a threshold voltage L. The inverter 248 produces a first signal having a narrow width and which is represented by B shown in FIG. 15. The inverter 249 produces a second signal having a wide width and which is represented by C in FIG. 15. The first signal B is inverted in a drive circuit 250, before it is applied to the base of the switching power transistor 3 to turn on the switching power transistor 3. The second signal C is differentiated in a drive circuit 251, before it is applied to the base of the switching power transistor 3 to turn off the switching power transistor 3. As a result, the base current is as shown by D in FIG. 15.

The foregoing description has clarified that a switching power supply is successfully provided, such a switching power supply employing a base drive system wherein an interval is remained between a forward base current and a reverse base current and the collector current is allowed to continue flowing during the interval due to the storage time, resultantly removing the adverse effects of the storage time and enabling the switching power supply to decrease the turning-off time, resultantly realizing a higher switching frequency and a less amount of switching loss. Thus, the ultimate purpose to decrease the volume and weight of a switching power supply is successfully satisfied.

Although this invention has been described with reference to specific embodiments, this description is not meant to be construed in a limiting sense. Various modifications of the described embodiments, as well as other embodiments of this invention, will become apparent to persons skilled in the art upon reference to the description of this invention. It is therefore contemplated that the apended claims will cover any such modifications or embodiments as fall within the true scope of this invention.

What is claimed is:

1. A switching power supply comprising:
   a transformer having a primary winding which receives a DC input voltage,
   a switching means comprising a switching transistor which periodically interrupts the primary current of said transformer,
   a regulation means for regulating said switching means and for providing said switching transistor with a reverse base current a predetermined interval after the termination of a forward base current, said interval being approximately equal to the storage time of said transistor, whereby the base charge of said transistor is discharged during said interval,
   a rectifier for rectifying the AC output of said transformer, and
   a smoothing circuit for smoothing the DC output of said rectifier.

2. A switching power supply in accordance with claim 1, further comprising a second rectifier which receives an AC input voltage and which produces said DC input voltage to said transformer.

3. A switching power supply in accordance with claim 1 or 2, further comprising a means for monitoring the collector current of said switching transistor, a means for calculating, in response to said collector current, the storage time of said switching transistor and for calculating, in response to said storage time, the duration of said forward base current which is directed to said regulation means.

4. A switching power supply in accordance with claim 1 further comprising a means for monitoring the output voltage of said switching power supply, means for producing a reference voltage, and a means for calculating, in response to said output voltage, the ratio of the duration of said forward base current to the switching period of said switching power supply and for directing said ratio to said regulation means.

5. A switching power supply in accordance with claim 1, wherein the duration of said forward base current is 20 through 50% of the conductive period of said switching transistor.

6. A switching power supply in accordance with claim 4, further comprising a second rectifier which receives an AC input voltage and which produces said DC input voltage for said transformer.

7. A switching power supply in accordance with claim 4 or 6, further comprising a means for monitoring the collector current of said switching transistor, a means for calculating, in response to said collector current, the storage time of said switching transistor and for calculating, in response to said storage time, the duration of said forward base current which is directed to said regulation means.

* * * * *